United States Patent

Honma et al.

[11] Patent Number: 6,147,305
[45] Date of Patent: Nov. 14, 2000

[54] INSULATED MOUNTING STRUCTURE WITH A HARD INSERT

[75] Inventors: Tomoyuki Honma, Tokyo; Oji Mori, Kanagawa, both of Japan

[73] Assignee: NEC Corporation, Tokyo, Japan

[21] Appl. No.: 09/106,257

[22] Filed: Jun. 29, 1998

[30] Foreign Application Priority Data

Jun. 30, 1997 [JP] Japan ................................. 9-172681

[51] Int. Cl.[7] ................................................. H02G 3/08
[52] U.S. Cl. ............................ 174/52.1; 174/138 G; 174/58; 174/63; 174/48; 248/346.5
[58] Field of Search ............... 174/54, 58, 138 G, 174/138 D, 165, 158 R, 48, 49, 56, 61, 62, 63; 361/724, 728, 825; 248/346.5

[56] References Cited

U.S. PATENT DOCUMENTS

| Re. 32,678 | 5/1988 | Benscoter et al. | 52/221 |
|---|---|---|---|
| 4,495,515 | 1/1985 | Pamiello | 357/81 |
| 4,548,554 | 10/1985 | Angott | 417/572 |
| 4,907,124 | 3/1990 | Kaufman | 361/386 |
| 4,991,061 | 2/1991 | Strange | 361/417 |
| 5,546,275 | 8/1996 | Moutrie et al. | 361/707 |

FOREIGN PATENT DOCUMENTS

| 62-147382 | 9/1987 | Japan . |
|---|---|---|
| 2-2867 | 1/1990 | Japan . |
| 4-132298 | 5/1992 | Japan . |
| 6-85472 | 3/1994 | Japan . |

*Primary Examiner*—Jeffrey Gaffin
*Assistant Examiner*—Kamand Cuneo
*Attorney, Agent, or Firm*—McGuireWoods, LLP

[57] ABSTRACT

In an insulated mounting structure, a housing has a plurality of housing brackets and a platform for supporting the housing has a plurality of platform brackets. Each housing bracket is provided at a coupling portion of the housing and each having a notch. Each of the platform brackets is provided at a coupling portion of the platform corresponding to the housing bracket, each platform bracket having a screw hole for passing a mounting bolt. An insulating spacer is positioned on each of the platform brackets in a state of fitting into the notch of each of the housing brackets. The insulating spacer has a cylindrical member made of hard material inserted into the through hole of the insulating spacer to allow the mounting bolt to be tightened in a state of passing through the cylindrical member.

19 Claims, 5 Drawing Sheets

INSULATED MOUNTING STRUCTURE WITH A HARD INSERT

BACKGROUND OF THE INVENTION

1. Field of the Invention

The present invention relates to a mounting structure of a housing, and in particular to an insulated mounting structure for installing a housing which is a main body case of communication apparatus, electronic appliance or the like in an electrically insulated state.

2. Description of the Related Art

There have been proposed several insulated mounting structures using collars made of insulating material, for example, in Japanese Patent Unexamined Publication No. 6-85472.

As an example, FIG. 1 shows an insulated mounting structure of this kind. For example, a communication apparatus for outdoor installation has a housing 1 for composing the apparatus main body, and it is designed to install the housing 1 by supporting with a mounting frame 3 from beneath in the vertical direction. At the housing 1 side, a bracket 2 is provided as the base, and the mounting frame 3 also has a bracket 4 to be coupled with the bracket 2 by tightening together.

The bracket 2 of the housing 1 has a through hole 2a, and a screw hole 4a is provided in the bracket 4 of the mounting frame 3. Coupling of both brackets 2, 4 is achieved by using an upper spacer 5 and a lower spacer 6 provided in the vertical direction, and inserting a mounting bolt 7 through the upper and lower spacers 5, 6 and the through hole 2a of the bracket 2 of the housing 1 side. The upper and lower spacers 5, 6 are formed in a ring form by using an electrically insulating material. In the bracket 4 of the mounting frame 3 side, the mounting bolt 7 is inserted into its screw hole 4a.

However, the insulated mounting structure of the machine housing as shown in FIG. 1 includes the following problems to be solved.

First, when tightening with the mounting bolt 7, by the tightening force, the upper and lower insulating spacers 5, 6 made of soft material may be damaged or broken.

In other problem, when the housing mounting is done by one worker, while positioning the housing 1 to the mounting frame 3 by one hand, the mounting bolt 7 is inserted into plural mounting holes by centering and tightened to couple together by using a proper coupling tool by other hand. Therefore, it is difficult to do installation of the housing 1 which may drop out or fall unexpectedly during the work.

SUMMARY OF THE INVENTION

It is therefore an object of the invention to provide an insulated mounting structure which can achieve easy installation of a housing of communication apparatus or other machine in an electrically insulated structure. In other words, it can be done without problems such as breakage of the insulating material by the tightening force by the tightening member, and assuring safety in the housing installation work.

According to an aspect of the present invention, an insulated mounting structure for mounting a housing of a machine on a platform in an electrically insulating state is comprised of a plurality of housing brackets and a plurality of platform brackets. Each of the housing brackets is provided at a coupling portion of the housing and each having a notch. Each of the platform brackets is provided at a coupling portion of the platform corresponding to the housing bracket, each platform bracket having a screw hole for passing a mounting bolt which is used to connect the coupling portion of the housing to the coupling portion of the platform. Further, the structure is comprised of an insulating spacer having a through hole, wherein the insulating spacer is positioned on each of the platform brackets in a state of fitting into the notch of each of the housing brackets. The insulating spacer further has a cylindrical member made of hard material inserted into the through hole of the insulating spacer to allow the mounting bolt to be tightened in a state of passing through the cylindrical member.

According to another aspect of the present invention, in an insulated mounting structure for carrying on an installation platform plate and supporting a housing of a machine from beneath in the vertical direction, and tightening both coupling portions of the housing and the installation platform plate by a mounting bolt through an electrically insulating material, which comprises plural housing brackets having notches provided in the coupling portions of the housing, plural installation platform brackets provided at the coupling portions of the installation platform plate for receiving the housing brackets from beneath, and having screw holes for passing the mounting bolt, an electrically insulating spacer having a bolt through hole penetrating in the center, and positioned and held on the installation platform brackets in a state of fitting into the notches of the housing brackets, and a cylindrical collar member made of hard material formed in a cylindrical form having an inside diameter large enough for inserting the mounting bolt, being inserted into the bolt through hole of the insulating spacer.

The housing brackets may be positioned and held on the installation platform brackets through the insulating spacer in the initial stage of mounting the housing on the installation platform plates, and the cylindrical collar member and the screw holes in the installation platform brackets may be matched coaxially, thereby tightening by the mounting bolt.

The cylindrical collar member may be made of metal or rigid resin having a sufficient stiffness and strength in order to protect the insulating spacer from breakage due to tightening force by the mounting bolt.

DESCRIPTION OF THE PREFERRED EMBODIMENTS

Figure 1:
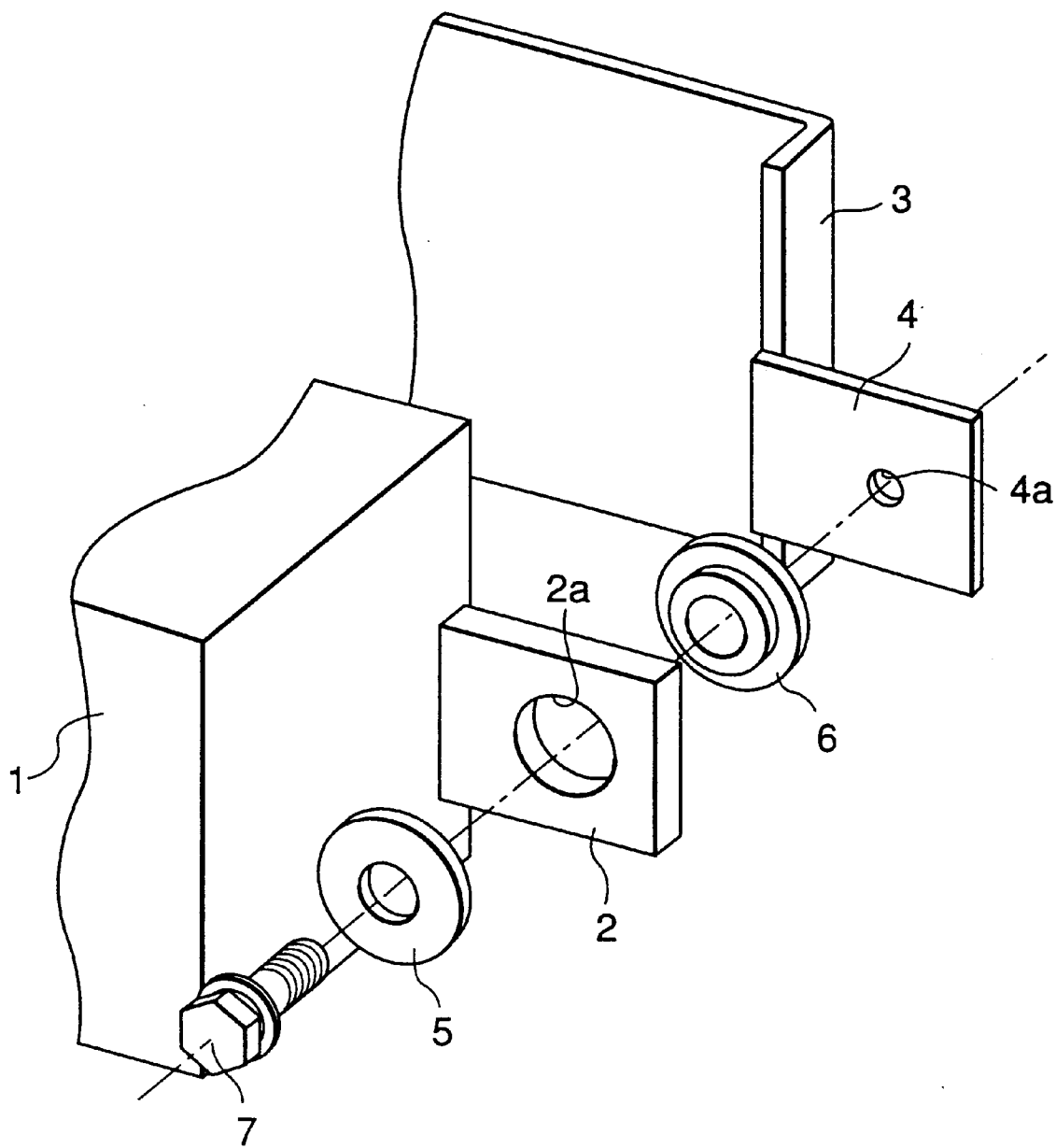
FIG. 1 is a perspective view showing a constitution of an conventional example of an insulated mounting structure.

There will be detailed below the preferred embodiments of the insulated mounting structure of machine housing according to the present invention with reference to the accompanying drawings.

Referring to FIGS. 2–6, a communication apparatus for outdoor installation, which is taken as an example, has a housing 10 in a flat rectangular shape for composing the main body of the apparatus, and the housing 10 is supported and fixed by an installation platform plate 20 from beneath in the vertical direction.

At the housing 10, a mounting housing bracket 11 having U-shaped recesses 12 at two positions each in the right and left side plates, or four positions in total, is projecting in the horizontal direction, with the recess open end 13 directed to the outside. A slit 14 is cut at the inner sides of the open end 13 opposite to each other.

Figure 4:
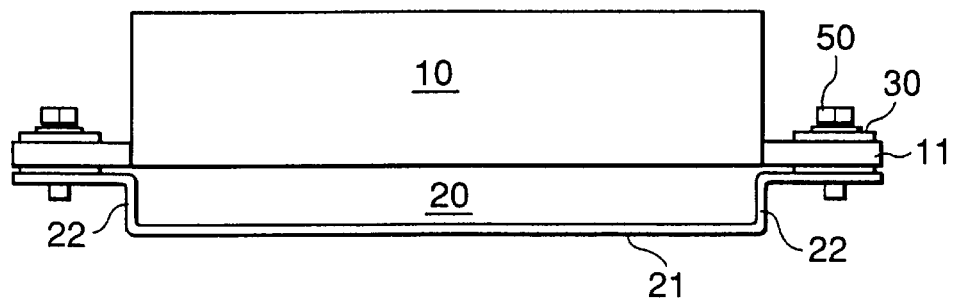
FIG. 4 is an assembly front view of the first embodiment.
Figure 5:
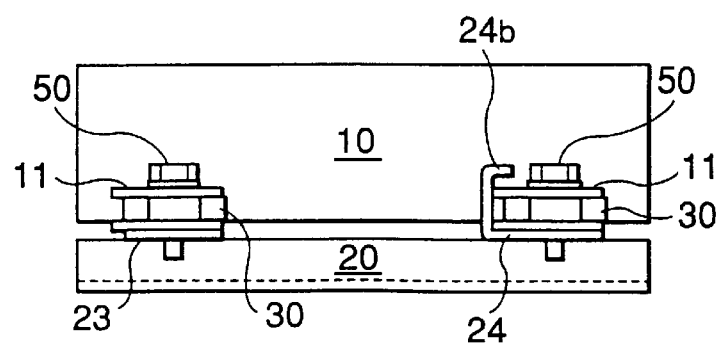
FIG. 5 is an assembly side view of the first embodiment.

The installation platform plate 20 has a flat shape enough to support and fix the housing 10 from beneath, and as clear from FIG. 4, it is formed in a shape of a tray. That is, a side wall 22 is raised around a bottom plate 21, and from right and left sides of the side wall 22, a pair of right and left installation platform brackets 23 for amounting and a pair of right and left installation platform brackets 24 are extended in the horizontal direction, at a total of four positions.

Figure 2:
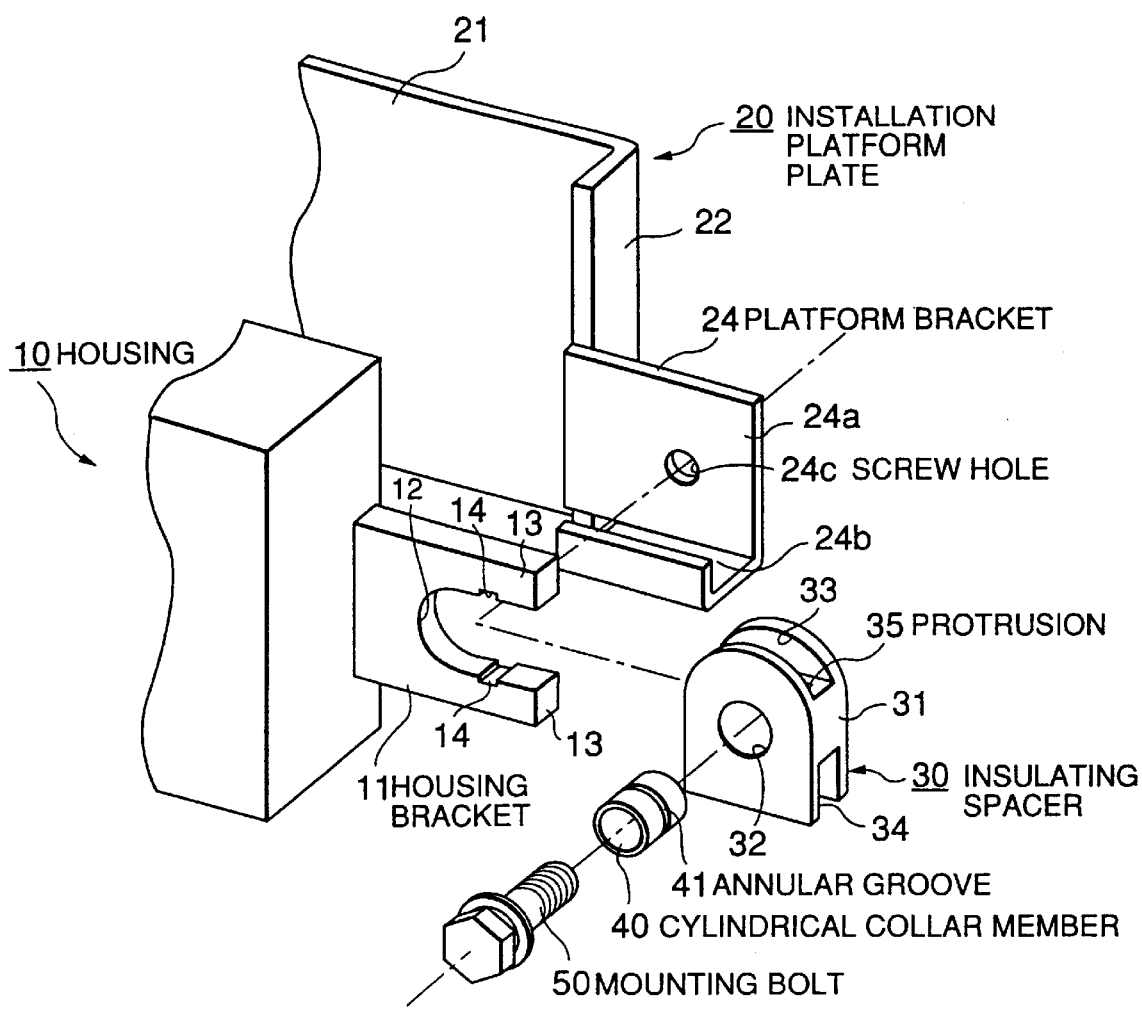
FIG. 2 is a perspective view showing a constitution of a first embodiment of an insulated mounting structure of machine housing according to the invention.
Figure 3:
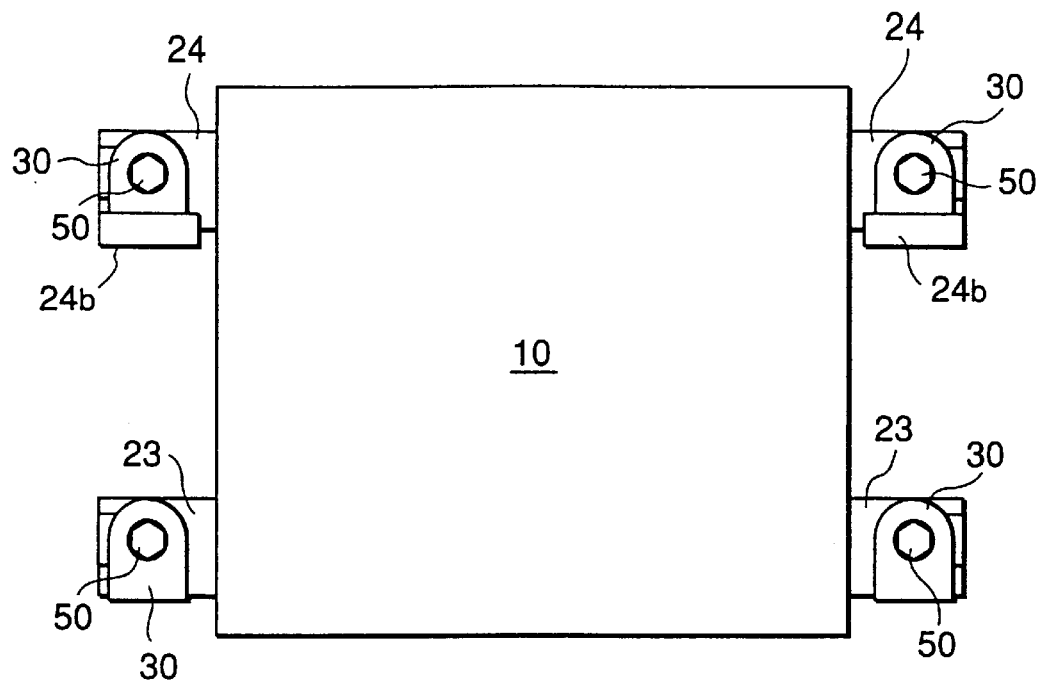
FIG. 3 is an assembly plan view of the first embodiment.

As shown in FIG. 2, the pair of right and left installation platform brackets 24 are processed by bending twice the spacer holding portion 24b at one end of the horizontal main plate portion 24a. A screw hole 24c is provided in the main plate portion 24a for inserting a mounting bolt 50 described below.

A spacer 30 made of an electrically insulating material is processed alone and prepared so as to be interposed between the bracket 11 of the housing 10 and the bracket 23, 24 of the installation platform plate 20.

As the general shape of the insulating spacer 30 is clear in FIG. 2, a main body portion 31 has a specified thickness, and a through hole 32 for inserting bolt is provided in the center, penetrating in the thickness direction. On both sides of the through hole 32, fitting grooves 33, 34 are formed in a direction orthogonal to the thickness direction of the main body portion 31. In one fitting groove 33, it is processed so that one open end 13 of the housing bracket 11 is fitted, and in the other fitting groove 34, other open end 13 of the housing bracket 11 is fitted. In the bottoms of both fitting grooves 33, 34, protrusions 35 to be engaged with slits 14 formed in both open ends 13 when fitting the housing bracket 11 are formed to fix the insulating spacer 30 to the housing bracket 11 at the proper position.

This insulating spacer 30 has the size and shape to be carried on the main plate portion 24a of the installation platform bracket 24 in the assembled state being fitting into the housing bracket 11. The insulating spacer 30 having such shape is positioned and held as being engaged with a spacer holding portion 24b which is formed by bending press of the installation platform bracket 24.

In the bolt hole 32 penetrating through the center of the insulating spacer 30, a cylindrical collar member 40 made of metal or hard resin is fitted and is integrated. An annular groove 41 is formed around the cylindrical collar member 40. Corresponding to the annular groove 41, a protrusion 42 (see FIG. 6) is formed on the inner circumference of the through hole 32 of the insulating spacer 30, and by engaging the annular groove 41 with its protrusion when fitting, the cylindrical collar member 40 is prevented from slipping out of the insulating spacer 30 after fitting.

Therefore, by interposing the insulating spacer 30, the insulated mounting structure is designed to couple the housing 10 on the lower installation platform plate 20 by tightening both mounting brackets 11, 24 together.

Figure 6:
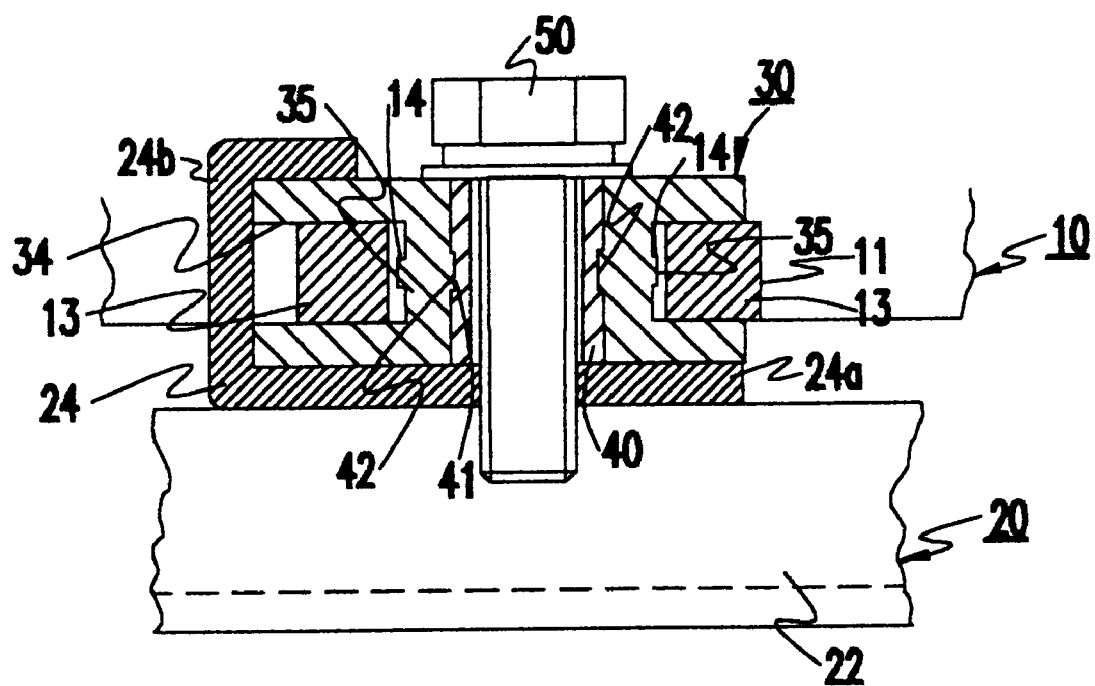
FIG. 6 is an assembly side sectional view of the first embodiment.

Referring also to an assembly sectional view in FIG. 6, the mounting of the housing 10 will be described hereinafter. Preliminarily, the insulating spacer 30 is fitted into each housing bracket 11 of the housing 11. The cylindrical collar 40 is assembled into the insulating spacer 30 and fitted integrally. The worker positions the insulating spacer 30 to the installation platform bracket 30 corresponding to each housing bracket 11 in assembled state, and puts the housing 10 on the installation platform plate 20.

At this time, in two brackets 24 at the installation platform plate 20 side, the insulating spacer 30 in assembled state with the pair of right and left housing brackets 11 abuts against the spacer holding portion 24b. Accordingly, the housing 10 may be temporarily positioned on the installation platform plate 20 almost instantly. By the temporary positioning, the cylindrical collar member 40 in the insulating spacer 30 and the screw hole 24c in the bracket 24 of the installation platform plate 20 coincide with each other coaxially.

In succession, the mounting bolt 50 is inserted into the cylindrical collar member 40, and is driven into the screw hole 24c of the installation platform bracket 24 at the opposite side. Now, each housing bracket 11 at the housing 10 side, and each installation platform bracket 24 at the installation platform plate 20 side are coupled together with the insulating spacer 30.

In this process, the worker does not have to support and hold the housing 10, from the step of inserting the mounting bolts 50 into all cylindrical collar members 40 until the step of driving into the installation platform bracket 24. The housing 10 is positioned almost completely when put on the installation platform plate 20, and is not deviated, and the worker does not have to mind falling of the housing 10, so that the housing 10 may be tightened fully by the mounting bolts 50 safely.

Figure 7:
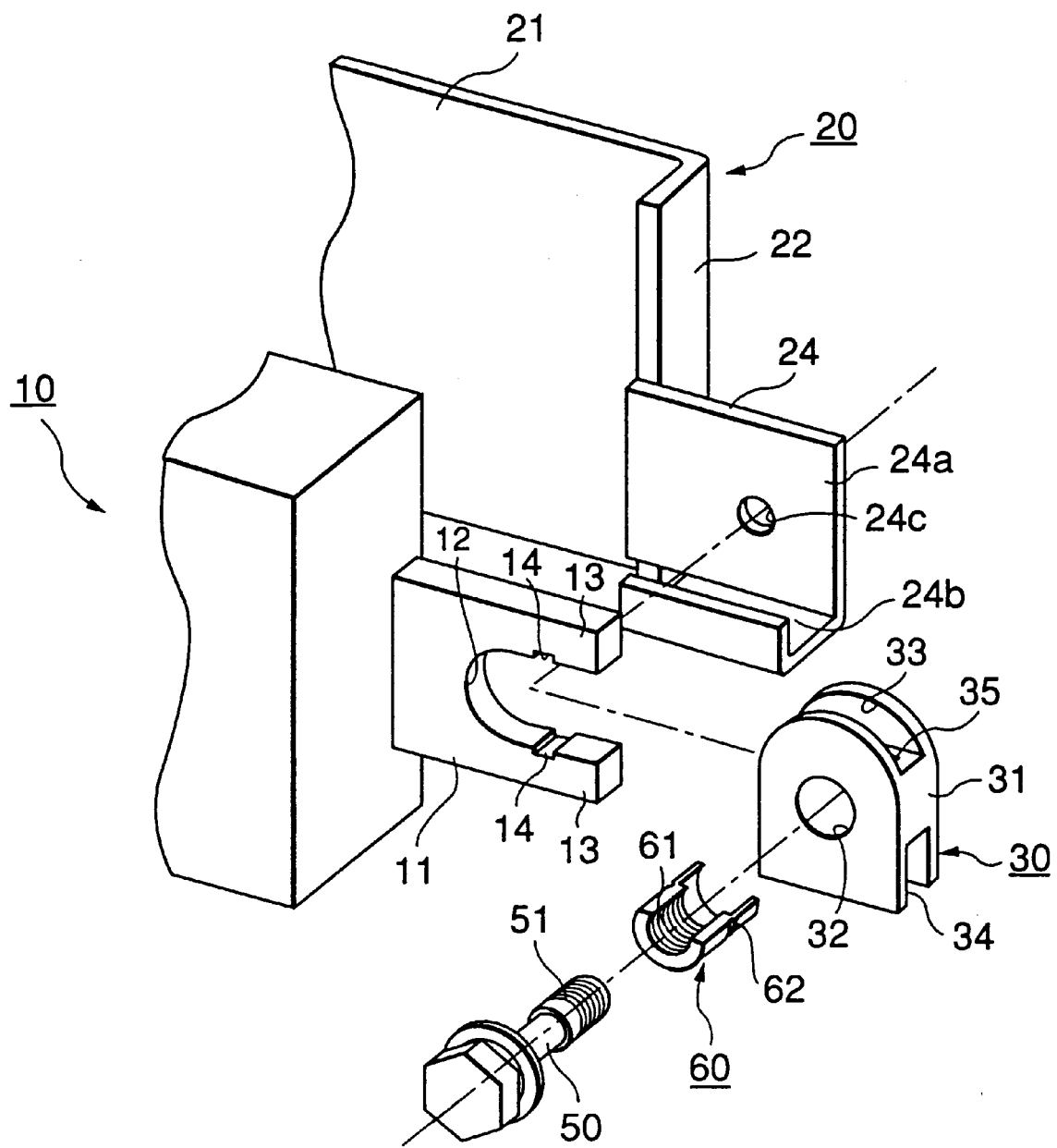
FIG. 7 is a perspective view showing a constitution of a second embodiment according to the present invention.

FIG. 7 is a perspective view showing a second embodiment of the invention. Same reference numerals are given to the common or similar members in the first embodiment as shown in FIGS. 2–6, and their repeated explanation is omitted.

In this case, instead of the cylindrical collar member 40 preliminarily fitted and set in the insulating spacer 30, a metal-made cylindrical collar member 60 is used. In the case of the cylindrical collar member 60, the mounting bolt 50 has screw threads 51 partially formed. Only a half cut section is shown in FIG. 6, and female threads 61 for engaging with the male threads 51 of the mounting bolt 50 are formed in the cylindrical inner circumference. In the cylindrical outer circumference, same as in the first embodiment, an annular groove 62 is formed to be engaged with a protrusion 42 provided in a bolt through hole 32 of an insulating spacer 30. Therefore, by driving the mounting bolt 50 into the female threads 61, the mounting bolt 50 is prevented from slipping out of the insulating spacer 30 during and after mounting work, and an anti-slipping function is obtained.

As described above, in the insulated mounting structure according to the present invention, when installing the housing, by only putting on the installation platform plate, the housing can be positioned almost instantly without any risk of falling, and complete tightening job by mounting bolts can be done, and the safety of installation work is enhanced.

Further, since the electrically insulating spacer interposed between the mounting brackets is tightened by the mounting bolts through the cylindrical collar member, breakage of the insulating spacer due to the bolt tightening force can be prevented by the rigidity and strength of the cylindrical collar member.

What is claimed is:

1. An insulated mounting structure mounting a housing of a machine on a platform, comprising:

a plurality of housing brackets each provided at a coupling portion of the housing and each having a notch;

a plurality of platform brackets each provided at a coupling portion of the platform corresponding to each housing bracket, each platform bracket having a screw hole for passing a mounting bolt which is used to connect the coupling portion of the housing to the coupling portion of the platform;

a plurality of insulating spacers each having a through hole, wherein each insulating spacer is positioned on each of the platform brackets in a state of fitting into the notch of each of the housing brackets; and a plurality of cylindrical members made of one of metal or hard resin inserted into the through hole of each insulating spacer to allow the mounting bolt to be tightened in a state of passing through each cylindrical member.

2. The insulating mounting structure according to claim 1, wherein each insulating spacer is engaged with the notch of each of the housing brackets through a connection mechanism.

3. The insulated mounting structure according to claim 2, wherein the connection mechanism comprises a recess portion and a protrusion for engaging with the recess portion, wherein one of the recess portion and the protrusion is provided in each insulating spacer and the other is provided in the notch of each of the housing brackets.

4. The insulated mounting structure according to claim 3, wherein each insulating spacer has a pair of grooves which are engaged with the notch of each of the housing brackets, wherein each groove has a protrusion, and the notch has a pair of recess portions on opposite sides of said insulating spacer wherein each recess portion is engaged with the protrusion of a groove of each insulating spacer.

5. The insulated mounting structure according to claim 1, wherein at least two of said plurality of platform brackets are each provided with a space holder portion for holding at least two of said plurality of insulating spacers so as to place it at a predetermined position for each insulating spacer to fit in the notch of each of the housing brackets.

6. The insulated mounting structure according to claim 1, wherein each cylindrical member has a bolt through hole having an inside diameter enough for inserting the mounting bolt.

7. The insulated mounting structure according to claim 1, wherein each cylindrical member has a bolt through hole having female threads which are engaged with the mounting bolt.

8. An insulated mounting structure for mounting and supporting a housing of a machine on an installation platform plate from beneath in the vertical direction with tightening both coupling portion of the housing and the installation platform plate by mounting bolts, comprising:

a plurality of housing brackets provided in the coupling portion of the housing, respectively, wherein each housing bracket has a notch;

a plurality of installation platform brackets provided at the coupling portions of the installation platform plate, respectively, for receiving each housing brackets from beneath, respectively, wherein each installation platform bracket has a screw hole for passing a mounting bolt;

a plurality of electrically insulating spacers each having a through hole penetrating in its center, wherein each electrically insulating spacer is positioned and held on the installation platform brackets in a state of fitting into the notches of the housing brackets; and a plurality of cylindrical collar members made of one of hard resin or metal formed in a cylindrical form having an inside diameter enough for inserting the mounting bolt, wherein each cylindrical collar member is inserted into the through hole of each insulating spacer.

9. The insulated mounting structure according to claim 8, wherein female threads to be engaged with the mounting bolt are formed in the inner circumference of each cylindrical collar member.

10. The insulated mounting structure according to claim 8, wherein each housing bracket is positioned and held on each installation platform bracket through each insulating spacer in the initial stage of mounting the housing on the installation platform plate, and each cylindrical collar member and the screw holes in each installation platform bracket are matched coaxially, thereby tightened by the mounting bolt.

11. The insulated mounting structure according to claim 10, wherein a convex portion and a concave portion are disposed in the notch of each housing bracket so as to engage by clicking between on and other portion of fitting of each insulating spacer.

12. The insulated mounting structure according to claim 10, wherein female threads to be engaged with the mounting bolt are formed in the inner circumference of each cylindrical collar member.

13. The insulated mounting structure according to claim 10, wherein each installation platform bracket has a spacer holding portion pressed and bent at one end thereof, and each insulating spacer in a state of fitting each housing bracket into the spacer holding portion is designed to position and hold instantly.

14. The insulated mounting structure according to claim 8, wherein a convex portion and a concave portion are disposed in the notch of each housing bracket so as to engage by clicking between one and other portion of fitting of each insulating spacer.

15. The insulated mounting structure according to claim 11, wherein female threads to be engaged with the mounting bolt are formed in the inner circumference of each cylindrical collar member.

16. The insulating mounting structure according to claim 14, wherein each installation platform bracket has a spacer holding portion pressed and bent at one end thereof, and each insulating spacer in a state of fitting each housing bracket into the spacer holding portion is designed to position and hold instantly.

17. The insulated mounting structure according to claim 8, wherein female threads to be engaged with the mounting bolt are formed in the inner circumference of each cylindrical collar member.

18. The insulated mounting structure according to claim 8, wherein each installation platform bracket has a spacer holding portion pressed and bent at one end thereof, and each insulating spacer in a state of fitting each housing bracket into the spacer holding portion is designed to position and hold instantly.

19. The insulating mounting structure according to claim 18, wherein female threads to be engaged with the mounting bolt are formed in the inner circumference of each cylindrical collar member.

* * * * *